United States Patent [19]

Kira

[11] Patent Number: 5,533,392
[45] Date of Patent: Jul. 9, 1996

[54] SYSTEM AND METHOD FOR SENSING MATERIAL LEVEL WITHIN A CONTAINER

[75] Inventor: Alan K. Kira, Honolulu, Hi.

[73] Assignee: Tecnetics Industries, Inc., St. Paul, Minn.

[21] Appl. No.: 243,887

[22] Filed: May 17, 1994

[51] Int. Cl.$^6$ .................................................. G01F 23/00
[52] U.S. Cl. ........................... 73/290 B; 33/720; 73/321
[58] Field of Search ................................. 73/290 B, 321, 73/290 R; 33/713, 714, 715, 716, 719, 720

[56] References Cited

U.S. PATENT DOCUMENTS

| | | | |
|---|---|---|---|
| 2,854,752 | 10/1958 | Heacock | 33/715 |
| 3,099,158 | 7/1963 | Barker, Jr. | 73/321 |
| 3,140,609 | 7/1964 | Mayes | 73/321 |
| 3,401,563 | 9/1968 | Lonnon | 73/321 |
| 3,708,159 | 1/1973 | De Bray | 73/290 R X |
| 3,729,667 | 4/1973 | Taylor | 73/321 X |
| 4,219,133 | 8/1980 | Sinsky | 33/716 X |
| 4,255,859 | 3/1981 | Klieman | 73/321 X |
| 4,276,774 | 7/1981 | McGookin | 73/290 B |
| 4,786,846 | 11/1988 | Uchida | 73/290 R |
| 4,875,295 | 10/1989 | Fleckenstein | 33/720 |
| 4,910,878 | 3/1990 | Fleckenstein et al. | 33/719 |
| 5,363,565 | 11/1994 | Kaneko | 33/719 |

FOREIGN PATENT DOCUMENTS 45850  5/1966  Germany .................................. 73/321

*Primary Examiner*—William A. Cuchlinski, Jr.
*Assistant Examiner*—Willie Morris Worth

[57] ABSTRACT

A system for sensing the surface level of flowable material within a container, comprises a drop weight secured to a cable through a pulley for being disposed above the material and brought into contact with the surface level of the material. The cable is wound and anchored to a spool driven by a reversible motor. A transducer operably secured to the pulley provides an output responsive to the strain on the cable exerted by drop weight. A signal processor connected to the transducer generates an output signal responsive to the drop weight being supported by the material. A pulse generator for generating a plurality of pulses the number of which is proportional to the amount of rotation of the spool. A programmable controller drives the motor a forward direction to lower the drop weight toward the material surface and in the opposite direction to raise the drop weight substantially the same distance after the processor has detected that the drop weight has landed on the material surface and for calculating the surface level of the material based on the number of plurality of pulses generated by the pulse generator during rotation of the spool in the forward and reverse directions. A display is connected to controller for displaying the calculated level of the material surface. A method for sensing the material level within a container is also disclosed.

23 Claims, 5 Drawing Sheets

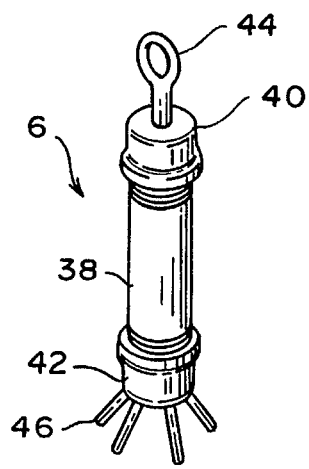
FIG. 2a
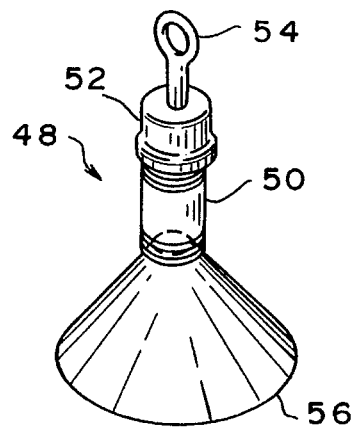
FIG. 2b
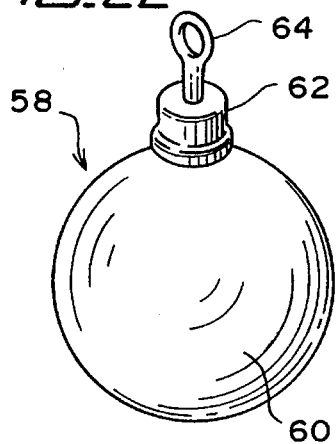
FIG. 2c
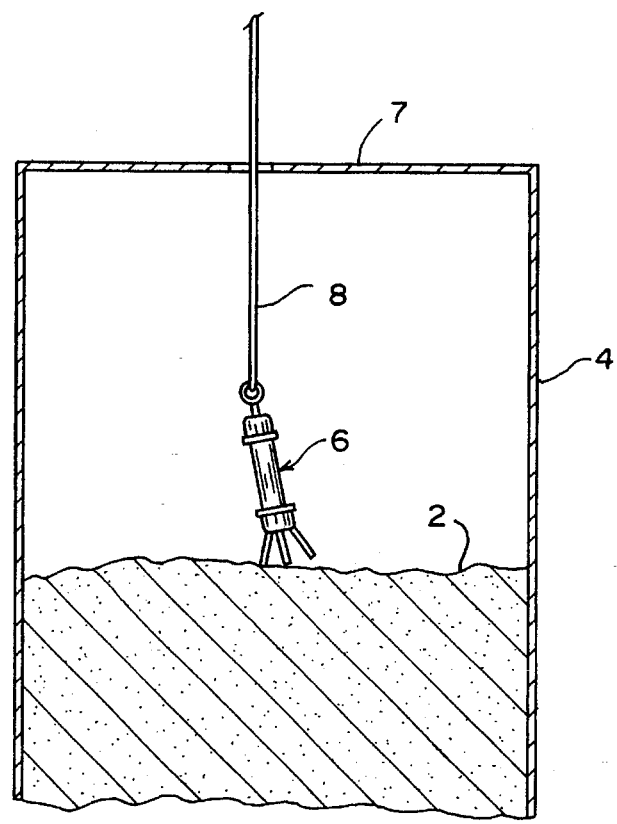
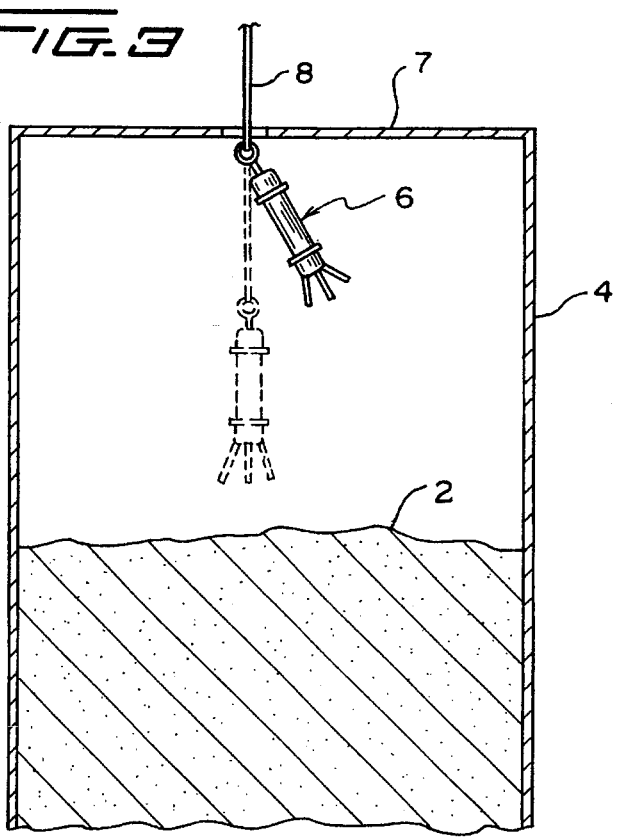
FIG. 3
FIG. 4

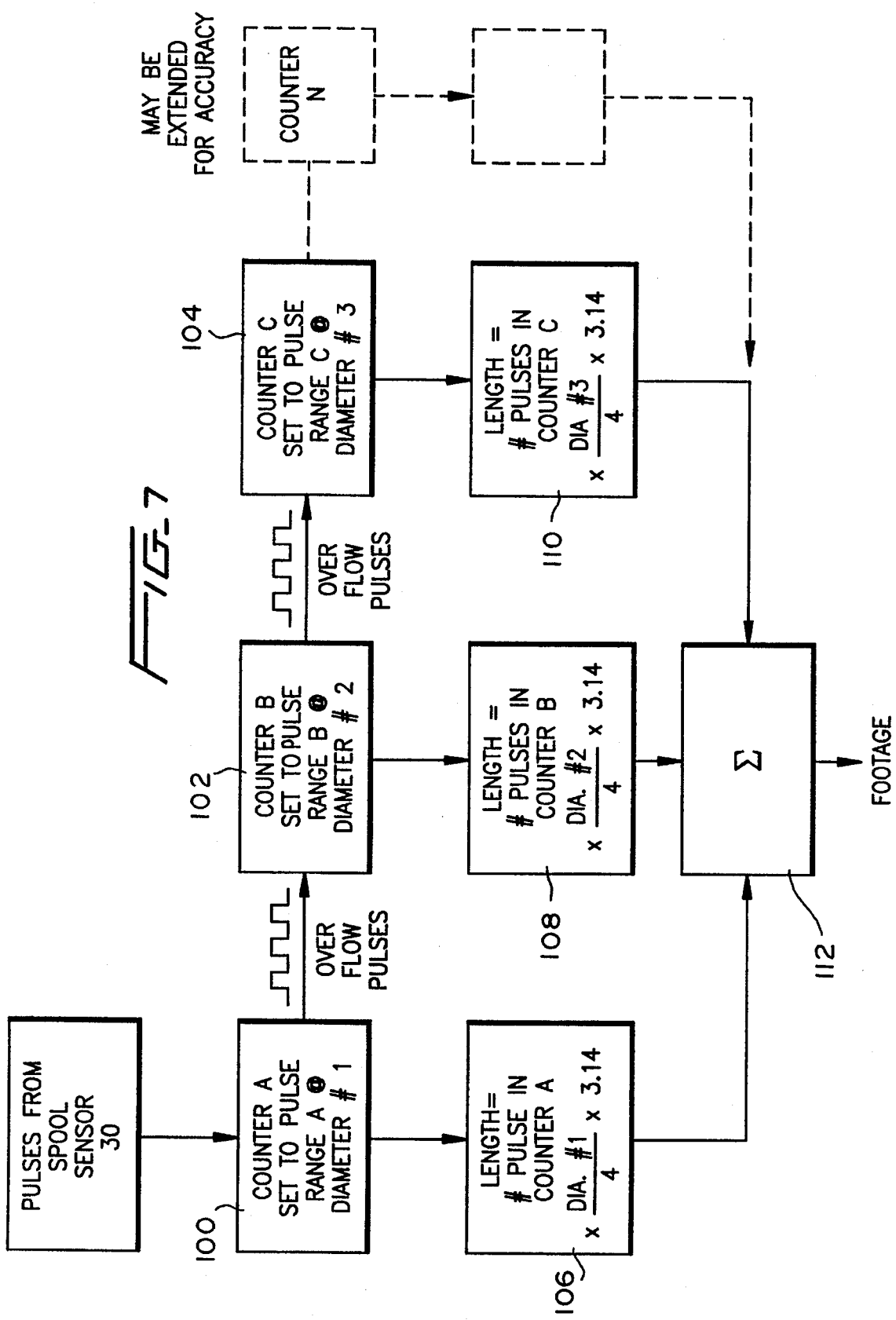
FIG_7

SYSTEM AND METHOD FOR SENSING MATERIAL LEVEL WITHIN A CONTAINER

FIELD OF THE INVENTION

The present invention generally relates to a system and method that detect the presence of stored flowable materials, such as rock, slurry, powder, liquid, granules and the like contained in a standard shaped container, whereby height information of the surface level of the material is converted to volume measurement or other indication of quantity for inventory or process control purposes. The present invention relates specifically to a system for sensing material level within a container using a programmable logic controller that controls the motion of a drop weight used to measure the height variation of a material within the container.

BACKGROUND OF THE INVENTION

There are numerous manufacturers and sellers of level sensing devices, each employing simple to very complex methods of sensing the presence of material at the point of contact or within the monitoring area. Most of the devices are designed for specific applications and therefore operate most reliably when situated within the environment for which they are designed. For example, a system for sensing the level of powder material within a container may not be suitable for sensing the level of a liquid and vice versa.

In a typical prior art level sensing system employing a drop weight, which is positioned in a standby or home position above the material between measurement cycles, the drop weight tends to creep towards the top surface of the material being sensed, such that over time the home or standby position of the drop weight departs substantially away from its original position. When the container is then refilled with the material, the drop weight would typically become buried in the material. Under this situation, when the system tries to lift the weight during a measurement cycle, the cable supporting the drop weight would typically break or the system would stall, which could lead to premature failure of the cable and unnecessary down-time to fix the problem.

These devices typically employ high technology and sophisticated components that support the associated sensing mechanisms and circuity, thereby requiring relatively sophisticated maintenance personnel to maintain, troubleshoot, calibrate and adjust the devices.

There is therefore a need for a material sensing system that addresses the problems of prior art devices.

OBJECTS AND SUMMARY OF THE INVENTION

It is an object of the present invention to provide a system and method for determining the level or height of a material within a containment that recalibrates the standby or home position of the weight above the material periodically between measurement cycles.

It is another object of the present invention to provide a system and method for determining the level or height of a material within a containment utilizing a weight attached to a cable that detects abnormal strain on the cable and provides relief therefor.

It is still another object of the present invention to provide a system and method for determining the level or height of a material within a containment wherein the measurement is checked for accuracy against a predetermined tolerance range.

It is an object of the present invention to provide a system and method for determining material level or height within a containment that takes into account the varying wrapping diameter of the cable within the spool when calculating the drop footage data.

It is another object of the present invention to provide a system and method for determining the level or height of a material within a containment that utilizes relatively sophisticated electronic components while remaining relatively simple to maintain, requiring only mechanical know-how on the part of maintenance personnel.

It is an object of the present invention to provide a system and method for determining material level or height within a containment that utilizes a programmable logic controller that retains operational parameters in the event of a power outage and automatically monitors operational status with a corresponding alarm message.

It is still an object of the present invention to provide a system and method for determining material level or height within a containment that monitors the position of the spool after the drop weight has been lowered and after it has been retrieved back to its home or standby position so that the drop weight can be returned back to its standby position relatively accurately.

These and other objects of the present invention will become apparent from the following detailed description.

BRIEF DESCRIPTION OF THE DRAWINGS

FIGS. 2(a), 2(b) and 2(c) are top perspective views of various embodiments of the drop weight used in the present invention.

FIG. 3 is a fragmentary cross-sectional view of the system of FIG. 1 showing the drop weight resting on top of the material being sensed.

FIG. 4 is a fragmentary cross-sectional view of the system of FIG. 1 showing the drop weight home position being recalibrated.

FIG. 7 is a schematic flow chart showing a process for accounting for changes in spool diameter during operation due to overlapping cable in the spool.

DETAILED DESCRIPTION OF THE INVENTION

Figure 1:
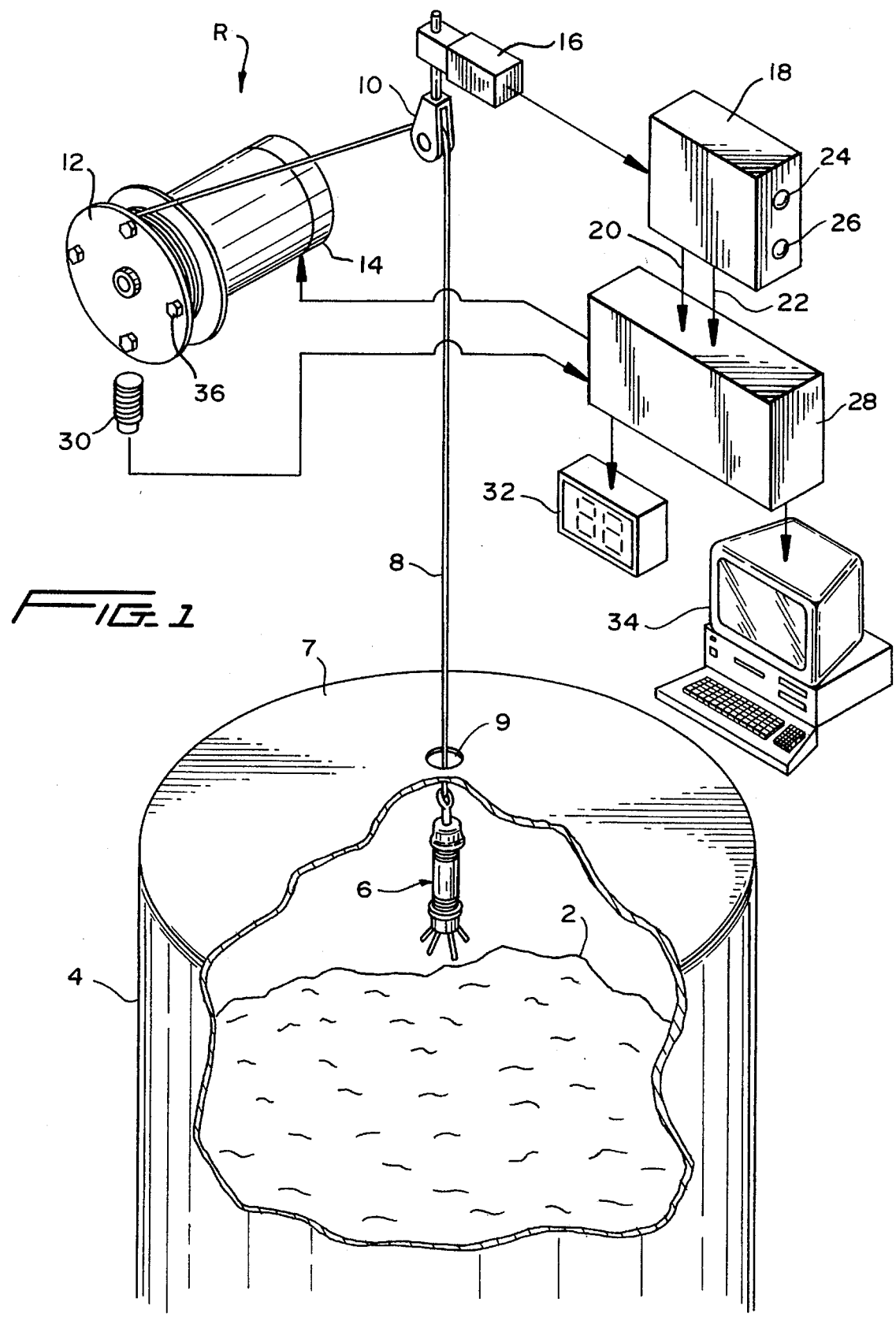
FIG. 1 is a schematic perspective view of a system for determining the level or height of a material within a containment made in accordance with the present invention.

A system R for sensing the material level 2 within a container 4 in accordance with the present invention is disclosed in FIG. 1. The system R comprises a drop weight 6 suspended from a cable 8 trained through an overhead pulley 10. The container 4 has a cover 7 with an opening 9 through which the cable 8 is disposed. The opening is sized such that the drop weight 6 will not pass therethrough, thus providing a stop, as will become clear below.

The drop weight 6 is adapted to be lowered toward the material level 2 by means of a spool 12 operated by an electric motor 14. A load cell 16 supporting the pulley 10 provides a signal responsive to predetermined strain exerted on the cable 8 by the drop weight 6 and any other forces. The load cell 16 is a standard strain gage force transducer or electronic force measurement device such as one available from Interface, Inc., 7401 E. Butherus Drive, Scottsdale, Ariz. 85260. The load cell 16 provides a voltage output that is indicative of the force exerted thereon.

The output signal from the load cell 16 is fed to a strain gage signal processor 18, such as that available from Absolute Process Instruments, Inc., 942-B Turret Ct., Mundelein, Ill. 60060, model Api 1520G. The processor 18 provides high and low alarm trip signals 20 and 22, respectively, in response to the output signal from the load cell 16 being outside a preset band. Indicating lights 24 and 26 provide indication of the activation of the alarm trips.

A system main controller 28 controls the operation of the motor 14 by means of the input signal provided by a spool sensor 30 and the processor 28. Display device 32 is operably connected to the controller 28 for displaying the measurement data generated during a measurement cycle. A personal computer 34 may also be connected to the controller 28 for receiving and processing the generated measurement data, using standard application software.

The spool 12 has four equally spaced ferrous members 36, such as steel bolts or other magnetic materials that are electromagnetically picked up by the spool sensor 30 as the spool 12 is rotated by the motor 14. A greater number of the ferrous members 36 may be used, depending on the precision required for measurement. Generally, the greater the number of the ferrous members 36, the greater the precision, since the circumferential distance of the spool 12 can be subdivided into greater number of parts. The members 32 advantageously divide the circumference of the spool 12 into substantially equal arc portions.

The high and low alarm trip signals 20 and 22 of the processor 18 provide information to the controller 28 during a measurement cycle and to protect the cable 8 from undue strain. When the drop weight 6 has landed on the material surface 2, the load cell 16 will sense the absence of the strain on the cable 8 impressed by the weight of the drop weight 6 and alarm signal 22 will be sent to the controller 28. When the drop weight 6 becomes buried within the material or otherwise weighted down by excessive force, the high alarm signal 20 will be generated and sent to the controller 28.

The spool sensor 30 is a conventional proximity switch which generates a pulse for each pass of each member 36, whereby a pulse train is generated which is provided to the controller 28.

The controller 28 is a conventional programmable logic controller having a CPU unit, an 8-input type input unit, an 8-output type output unit and a program loader. The controller 28 has a number of programmable counters for storing the pulses generated by the spool sensor 30. The controller 28 used in the present invention is made by Idec Corporation (USA), 1213 Elko Drive, Sunnyvale, Calif. 94089-2211, model FA-1 Junior Series. Other manufactures programmable controllers may be used. The system main controller 28 will be described in greater detail below in conjunction with the operation of the system R.

The drop weight 6 comprises a tubular pipe 38 with upper and lower end caps 40 and 42, respectively, as best shown in FIG. 2(a). An eye bolt 44 is secured to the upper end cap 40 and is used to secure the drop weight 6 to the cable 8. A plurality of rods 46 are secured to the lower end cap 42 in a generally radiating fashion, as best shown in FIG. 2(a). The rods 46 advantageously provide stability when the drop weight 6 lands on the material surface. The drop weight 6 is advantageously used for granular solids, such as three-course rock, three-fine rock, sandblast sand and the like.

For sensing finer sand or powder, a drop weight 48 is used, as best shown in FIG. 2(b). The drop weight 48 comprises a tubular member 50 with an upper end cap 52 to which is secured an eye bolt 54. A hollow inverted cone 56 is secured by conventional means to the lower end of the tubular member 50, as best shown in FIG. 2(b).

For sensing slurry, liquid or the like, a drop weight 58 is used, as best shown in FIG. 2(c). The drop width 58 comprises a float 60 to which is secured a pipe end cap 62 with an eye bolt 64. The float 60 can take various shapes, such as a ball, as best shown in FIG. 2(c).

The controller 28 has provisions for inputting various constants for the operation of the system R, such as the height of the container 4; low and high level set points; home or standby position of the drop weight 6; frequency of recalibrating the home position of the drop weight 6; identification codes for each alarm output; and upper and lower data error margins. In an application where volume of the material is being monitored, the height of the surface level 2 of the material within the container 4 would be related to the volume of the material. The high and low level set points for the material level 2 advantageously provide the system R with the capability to drive external devices, such as pumps, valves, etc in response to the output signals generated when the setpoints are reached. The home position of the drop weight 6 is measured in terms of the number of pulses generated while the spool 12 unwinds starting with the drop weight 6 at its extreme top position against a stop, such as the cover 7 of the container 4, as best shown in FIG. 3.

The upper and lower limits for accepting measurement data insures that data outside the acceptable range would be rejected.

The system main controller 28 has provisions for programming with a number of alarm conditions, which are monitored by the controller 28 while in standby or during a measuring cycle. A specific alarm message is then output with a numerical code to the display 32 or PC 34 when one of the alarm conditions is triggered. These conditions include lowering the cable 8 without the drop weight 6 attached to it; raising the cable 8 without the drop weight 6 attached to it; lowering the drop weight 6 without proper pulse rate input from the spool sensor 30; raising the drop weight 6 without proper pulse rate input from the spool sensor 30; the drive motor 14 being excessively ON between starts and stops; the drive motor 14 being excessively ON cumulatively; measurement error; and cable excess tension.

The system main controller 28 generates several output signals responsive to the various input signals provided by the processor 18, the spool sensor 30, the programmed input constants and alarm conditions described above. The respective output signal drives the motor 14 in the forward or reverse direction, reset the counter in the display 32, sends a pulse train indicative of the height measurement of the material level 2, drives an external device responsive to the high or low level presets, outputs an alarm code in the display 32, and outputs an all clear signal based on a self-diagnostic test.

Figure 5:
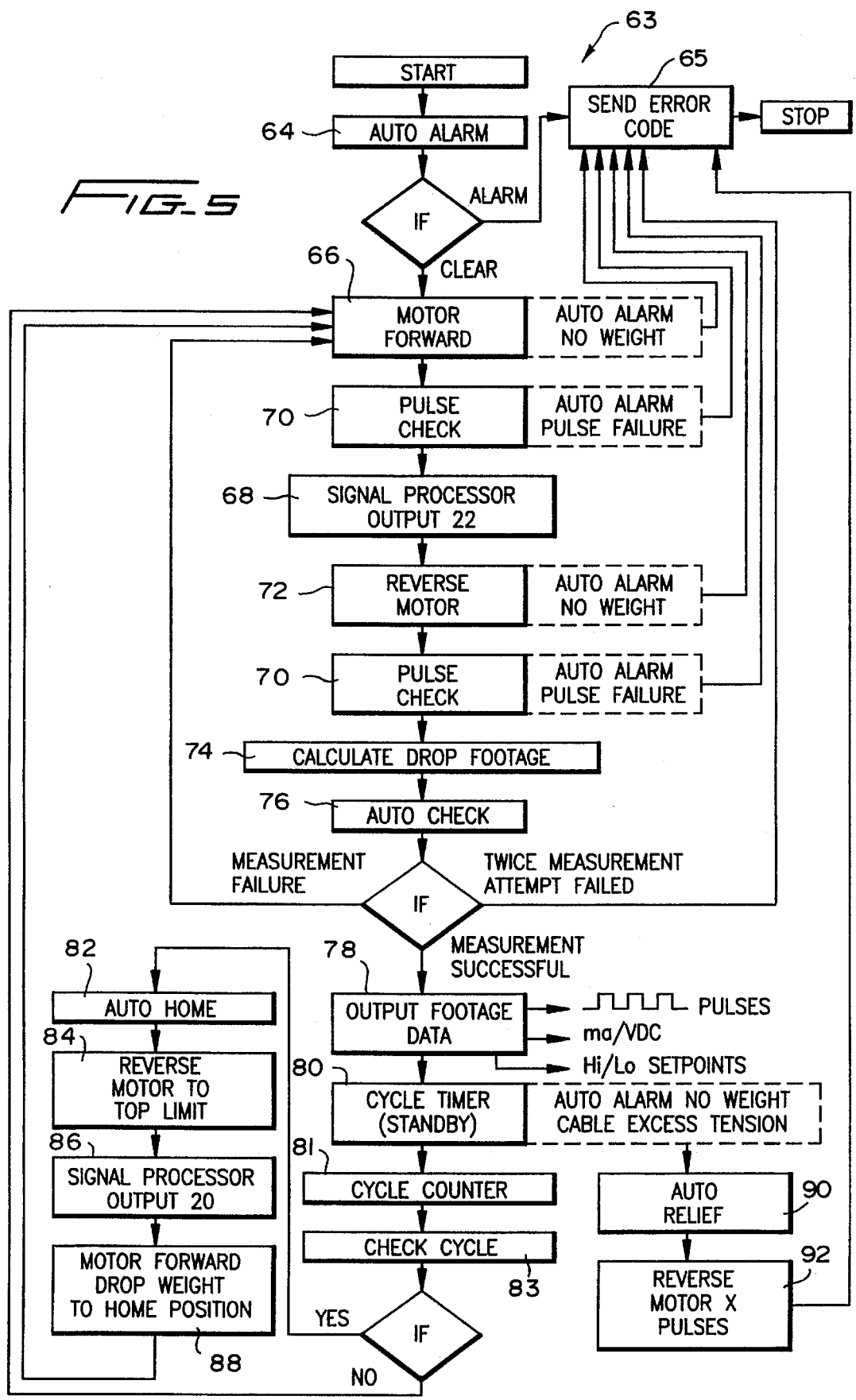
FIG. 5 is a schematic flow chart showing the overall operation of the system of FIG. 1.

In operation, power is applied to the system main controller 28 to start a measurement cycle 63, as best shown in FIG. 5. An AUTO ALARM routine 64 is activated and proceeds to monitor all critical operation of the system and outputs a specific alarm message for each of the alarm conditions described above while in standby or during a measurement cycle. If the AUTO ALARM routine 64 finds no alarms, the controller 28 energizes the motor 14, generally indicated at 66, in the forward direction, causing the drop weight 6 to be lowered toward the material surface level 2. If an alarm exists, an error code is sent to the display 32, generally indicated at 65.

The controller then monitors and analyzes the output from the processor 18, generally indicated at 68, for the low alarm signal 22, which is generated when the drop weight 6 lands on the material surface level 2, as best shown in FIG. 3. The motor 14 will continue to rotate in the forward direction until the output signal 22 is detected.

During downward motion of the drop weight 6, the controller 28 checks that pulse is being generated and received from the pulse sensor 30 through a PULSE CHECK routine 70. If pulses are not detected, then an alarm is triggered through AUTO ALARM routine 64, which sends an error code to the display 32 and stops the operation until the alarm is cleared. The PULSE CHECK routine 70 insures that a false pulse will not be input to the controller 28, thus ensuring that the drop weight 6 will be returned to its original home position after completing each measurement cycle. The PULSE CHECK routine 70 will either cause the motor 14 to move forward when the drop weight has landed on the material or reverse after the drop weight has been retrieved back to its home position if the spool 12 stops with a ferrous member 36 within the sensing range of the spool sensor 30.

When the signal 22 is detected, the controller 28 reverses the motor 14, generally indicated at 72, to raise the drop weight 6 back to its home position. The PULSE CHECK routine 70 determines if one of the ferrous members 36 is within the sensing range of the spool sensor 30 and reverses the motor 14 to position the ferrous member 36 past the spool sensor 30. The drop weight 6 is retrieved back to its home position through the same number of pulses that it took to bring it to the surface of the material.

During upward motion of the drop weight 6, the controller 28 checks that pulse is being generated and received from the pulse sensor 30 through the PULSE CHECK routine 70. If the proper pulse rate is not detected, then an alarm is triggered through AUTO ALARM routine 64, which sends an error code to the display 32 and stops the operation until the alarm is cleared.

The controller 28 now calculates the drop footage, generally indicated at 74. Pulse counters within the controller 28 accumulate the number of pulses of the drop and calculate the footage by using incremental changes in the diameters of the cable wrap due to the cable thickness. Calculation is based on the diameter of the spool 12, the number of the ferrous members 36, and thickness of the cable 8. Each pulse represents a quarter turn of the spool 12 where there are four ferrous members 36, as best shown in FIG. 1. Thus, assuming that the cable wrapping diameter stays constant, the drop footage is equal to the number of pulses times one-fourth of the cable wrapping diameter multiplied by 3.14 (pi) of the spool 12.

The controller 28 then tests the calculated footage through an AUTO CHECK routine 76. If the data is within historical limits, the routine 76 will enable output pulses to drive external devices, such as the display 32, computer 34, etc, generally indicated at 78. If the data is not within historical limits, the AUTO CHECK routine 76 will disable the output of the calculated footage and perform another measurement cycle. If the data is again out of historical limits, the routine 76 will change the historical data by replacing it with the present reading and make yet another measurement cycle to test the presence of the new level. If the data is within the amended historical limits, then the data will be output to the display 32 or other external devices. However, if the routine 76 still detects data outside the amended historical limits, then a measurement alarm message is produced and operation is stopped.

The footage output of the controller 28 is in pulses, current per volts DC or high/low setpoints. The output can be used to control external devices such as pumps, valves, conveyors, feeders, etc. in conjunction with the two predetermined high/low setpoints. The footage output of the controller 28 may be used to activate an exterior device when the material level reaches a predetermined high or low point.

After a measurement cycle, the system R goes into a standby mode, generally indicated at 80, until the next cycle dictated by a timer counter 81 of the controller 28. During standby, an alarm will be generated through the AUTO ALARM routine 64 if no weight or excess tension on the cable 8 is detected by the signal processor 18.

Over time the home position of the drop weight 6 would tend to drift toward the material level 2, losing calibration, causing level errors and other problems. This downward drift is caused by several factors, including the mechanical drift of the cable 8, the random positioning of the ferrous members 36 with respect to the spool sensor 30, power outage to the system R during a measuring cycle, and other factors. In the extreme, as the sensor weight 6 gradually loses its original home position and approaches the material level 2 and the user refills the container 4, thinking that the drop weight 6 is at its original home position, the drop weight 6 would become buried in the material. When this happens, excessive strain will be imposed on the cable 8 and the motor 14 when the controller 28 tries to retrieve the drop weight 6.

Figure 6:
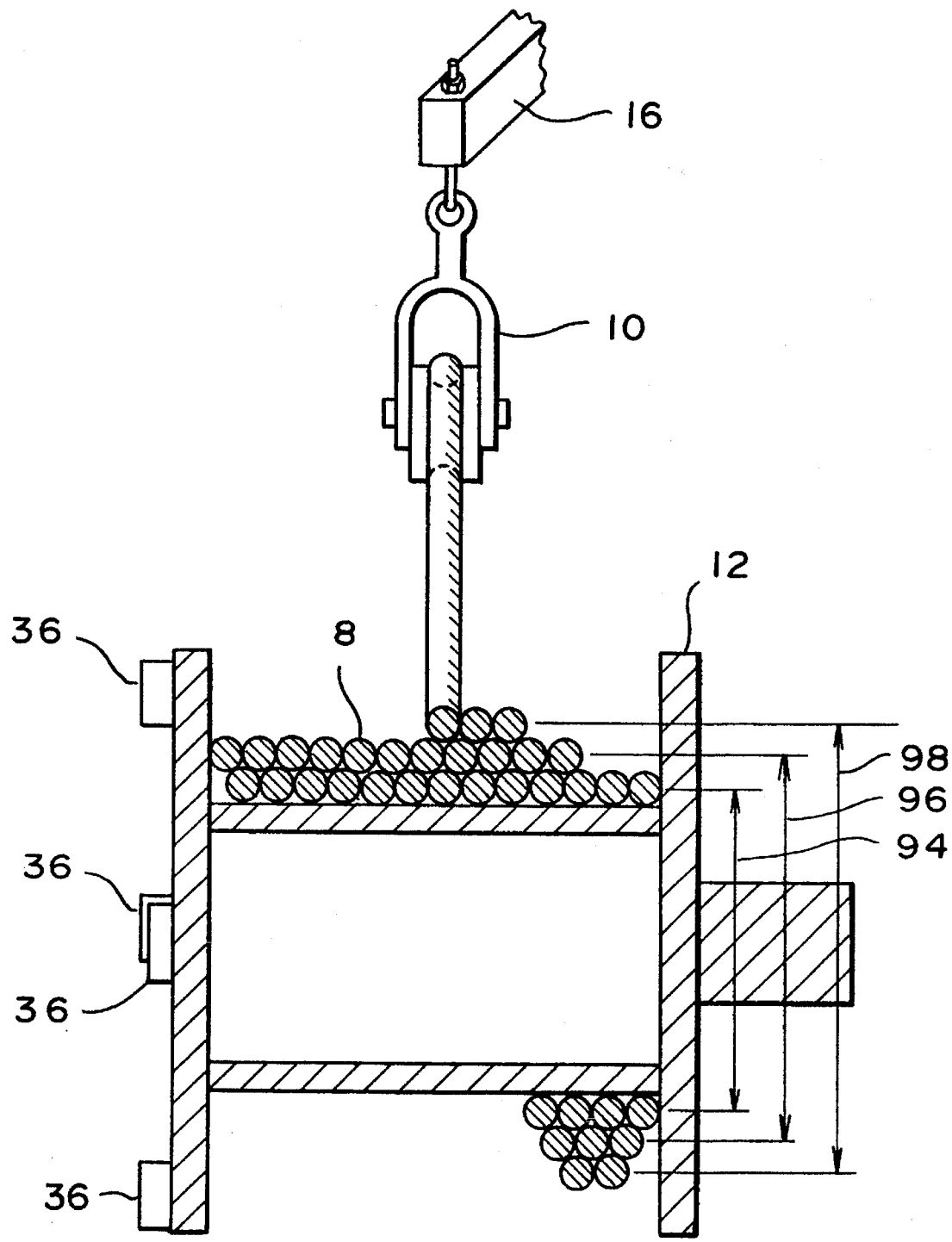
FIG. 6 is schematic cross-sectional view taken across the spool of FIG. 1.

To obviate the above problem, the controller 28 will execute an AUTO HOME routine 82, as best shown in FIG. 6, after a predetermined number of measurement cycles as generally indicated at 83, to accurately reposition the drop weight 6 to its home or standby position. Although the PULSE CHECK routine 70 adjusts for proper positioning of the ferrous members 36 when the drop weight 6 lands on the material or reaches its home position, errors inevitably occurs that the routine cannot correct. The AUTO HOME routine 82 ensures that the home position of the drop weight 6 is maintained. After a predetermined number of measurement cycles, the AUTO HOME routine 82 reverses the motor 14 toward a stop, generally at 84, such as the cover 9 of the container 4. As the drop weight 6 engages the cover 7, as best shown in FIG. 4, tension on the cable 8 increases beyond the normal strain imposed by the drop weight 6. The high trip alarm signal 20 will be generated by the processor 18, generally at 86, which is then picked up by the controller 28. When the signal 20 is detected, the motor 14 is immediately driven forward, generally at 88, through a predetermined pulse count, which determines its home or standby position. Thus, the home position is advantageously recalibrated, obviating any drift of the drop weight 6 away from its home position.

An AUTO RELIEF routine 90 is designed to unwind a portion of the cable 8 anytime there is excessive strain on the cable 8 caused by a buried drop weight 6 or other abnormal loading on the cable. The routine 90 monitors the high alarm trip output signal 20 from the processor 18. When the signal 20 is detected, the controller drives the motor 14 forward a certain amount to unwind the cable 8, generally indicated at 92, thereby releasing the strain on the cable. An alarm message will then be generated at 65 and the system will shut down.

Where the drop footage for the drop weight 6 is greater than what will fit at one diameter across the width of the spool 12, the cable will wrap around the spool in more than one diameter. Referring to FIG. 6, the cable portion around the spool 12 is illustratively disposed in various diameters 94, 96 and 98. In calculating the drop footage, cable disposed around diameter 94 will have different length when stretched out than the portion of the cable in diameter 96 or 98. To provide an accurate calculation of the drop footage, the varying diameters of the cable wrap must be taken into account.

When the expected drop footage exceeds more than one wrapping diameter, the cable portion within the spool is divided into several counters. The first portion of the cable disposed in the largest wrapping diameter, such as diameter 98, is assigned to counter A. The next largest wrapping diameter 96 is assigned to counter B and the next wrapping diameter 94 is assigned to counter C, as best shown in FIG. 7. The number of pulses generated by the spool 12 due to the cable portion in diameter 98, denominated as range A, is recorded in counter A, generally indicated at 100. The pulse train generated by the cable in diameter 96, denominated as range B, is stored in counter B, generally indicated at 102. The pulse train generated by the cable in diameter 94, denominated as range C, is stored in counter C, generally indicated at 104. If the expected drop footage is greater than the three wrapping diameters, then additional counters may be assigned to account for the additional pulse trains generated.

The length of the cable portion in diameter 98 is calculated by multiplying the number of pulses in counter A, the diameter 98, the factor 3.14 and dividing by 4, as generally indicated at 106. Similar calculations are performed at 108 and 110. The results of the individual results at 106, 108 and 110 are summed at 112 to arrive at the total drop footage. Thus, a relatively accurate footage data is obtained.

The controller 28 is also programmed to maintain the operational parameters in event of a power failure. For example, if power is cut off during a measurement cycle, the controller 28 will know where it stopped so that it will resume at that point when power is restored.

The timer of controller 28 is programmable from several minutes to hours.

The controller 28 also includes a manual start-stop feature so that measurement can be performed without waiting for the timer to run out.

The controller 18 monitors the exact running time of the motor 14 and outputs a Motor Maintenance Alarm code to inform maintenance personnel of the necessity to perform such tasks so as to prolong the useful life of the motor 14, such as oiling, cleaning its commutator, replacing brushes, etc.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A system for sensing the surface level of flowable material within a container, comprising:
   a) a drop weight for being disposed in a standby position above the material and brought into contact with the surface level of the material;
   b) a cable for suspending said drop weight above the material;
   c) a rotatable spool to which said cable is wound and anchored;
   d) a reversible motor coupled to said spool for rotating said spool such that said cable is drawn in or payed out for raising or lowering said drop weight above the material surface level;
   e) a transducer operably associated with said cable for providing an output responsive to the strain on said cable;
   f) a signal processor connected to said transducer for processing the transducer output and generating a first output signal responsive to said drop weight being supported by the material and a second signal responsive to a strain on said cable in excess of the weight exerted by the drop weight;
   g) a pulse generator for generating a plurality of pulses the number of which is proportional to the amount of rotation of said spool;
   h) a programmable controller operably connected to said motor, said pulse generator and said signal processor;
   i) said controller for driving said motor in a first direction to lower said drop weight toward the material surface, driving said motor in a second direction to raise said drop weight substantially the same distance after said signal processor has detected that said drop weight is being supported on the material surface, and for calculating the surface level of the material based on the number of plurality of pulses generated by said pulse generator during rotation of said spool in the first direction;
   j) said controller for driving said motor in the first direction a predetermined amount of time in response to the second signal to thereby play out an amount of said cable to release the strain thereon; and
   k) a display operably connected to said controller for displaying the calculated level of the material surface.

2. A system as in claim 1, wherein:
   a) said pulse generator comprises a plurality of ferrous members disposed evenly around the periphery of said spool for dividing the spool periphery into substantially equal arcs; and
   b) said pulse generator includes a sensor disposed adjacent said spool for detecting the passing of each of said plurality of ferrous members when said spool is rotating.

3. A system as in claim 2, wherein:
   a) said controller is adapted to drive said motor in the first direction after said drop weight has landed on the material surface if one of said ferrous members is within the sensing range of said sensor.

4. A system as in claim 2, wherein:
   a) said controller is adapted to drive said motor in the second direction after said drop weight has been raised from the material surface if one of said ferrous members is within the sensing range of said sensor.

5. A system as in claim 1, wherein:

a) said controller is adapted to periodically raise said drop weight against a stop and lower said drop weight a predetermined distance, thereby maintaining the standby position of said drop weight substantially constant above the material.

6. A system as in claim 1, wherein:

a) said controller includes an output for activating an exterior device when the material level reaches a predetermined high point.

7. A system as in claim 1, wherein:

a) said controller includes an output for activating an exterior device when the material reaches a predetermined low point.

8. A system as in claim 1, wherein:

a) said controller is adapted to check the accuracy of the calculated data before it is sent to said display.

9. A system as in claim 1, wherein:

a) said controller includes a plurality of counters for grouping the plurality of pulses such that the various wrapping diameters of said cable in said spool is taken into account when calculating the surface level of the material.

10. A system as in claim 1, wherein:

a) said drop weight comprises a tubular member having upper and lower ends;

b) a plurality of rods secured to said lower end disposed substantially radially; and c) a hook secured to said upper end for securing to said cable.

11. A system as in claim 1, wherein:

a) said drop weight comprises an inverted cone.

12. A system as in claim 1, wherein:

a) said drop weight comprises a float.

13. A system as in claim 1, wherein:

a) said transducer is a strain gage load cell.

14. A method for sensing the surface level of a flowable material within a container, comprising the steps of:

a) positioning a drop weight attached to a cable above the material surface level at a home position at a predetermined distance below a stop;

b) lowering the drop weight toward the surface until it is supported thereon;

c) monitoring the distance traveled by the drop weight in the downward direction;

d) raising the drop weight substantially the same distance that the drop weight has traveled downwardly;

e) determining the height of the surface level of the material from the distance traveled by the drop weight in the downward direction; and f) periodically calibrating the home position of the drop weight by raising the drop weight until it engages the stop and lowering the drop weight the predetermined distance from the stop to the home position.

15. A method as in claim 14, wherein said step b) includes the step of:

a) generating a first plurality of pulses proportional to the distance traveled by the drop weight.

16. A method as in claim 15, wherein said step includes the step of:

a) generating a second plurality of pulses proportional to the distance traveled by the drop weight until the second plurality of pulses are equal to the first plurality of pulses.

17. A method as in claim 15, wherein said step of determining the height of the surface level of the material includes the step of:

a) counting the number of pulses generated in lowering the drop weight onto the material surface.

18. A method as in claim 14, wherein said step of monitoring the distance traveled by the drop weight includes the steps of:

a) providing the cable in a spool;

b) unwinding the cable; and c) counting the number of rotation of the spool to determine the distance traveled by the drop weight.

19. A method as in claim 14, wherein said step b) is implemented by the steps of:

a) providing a load cell;

b) supporting the cable from the load cell; and c) determining from the load cell that the drop weight is being supported on the surface of the material.

20. A method as in claim 14, wherein said step f) is implemented by the steps of:

a) providing a load cell;

b) supporting the cable from the load cell; and c) determining from the load cell that the drop weight has engaged the stop.

21. A method for sensing the surface level of a flowable material within a container, comprising the steps of:

a) positioning a drop weight attached to a cable above the material surface level;

b) lowering the drop weight toward the surface until it is supported thereon;

c) monitoring the distance traveled by the drop weight in the downward direction;

d) raising the drop weight substantially the same distance that the drop weight has traveled downwardly;

e) monitoring the stress on the cable when raising the drop weight and if the stress exceeded a predetermined amount, paying out the cable and stopping the measurement cycle; and f) determining the height of the surface level of the material from the distance traveled by the drop weight in the downward direction.

22. A method as in claim 21, wherein said step b) is implemented by the steps of:

a) providing a load cell;

b) supporting the cable from the load cell; and c) determining from the load cell that the drop weight is being supported on the surface of the material.

23. A method as in claim 21, wherein said step e) is implemented by the steps of:

a) providing a load cell;

b) supporting the cable from the load cell; and c) determining from the load cell when the stress on the cable has exceeded the predetermined amount.

* * * * *